R. HUFF.
MOTOR VEHICLE.
APPLICATION FILED MAY 18, 1908.
915,769.
Patented Mar. 23, 1909.
2 SHEETS—SHEET 1.
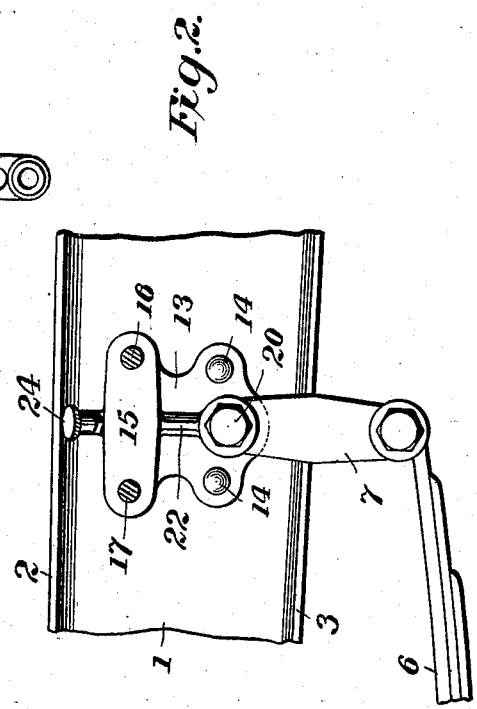
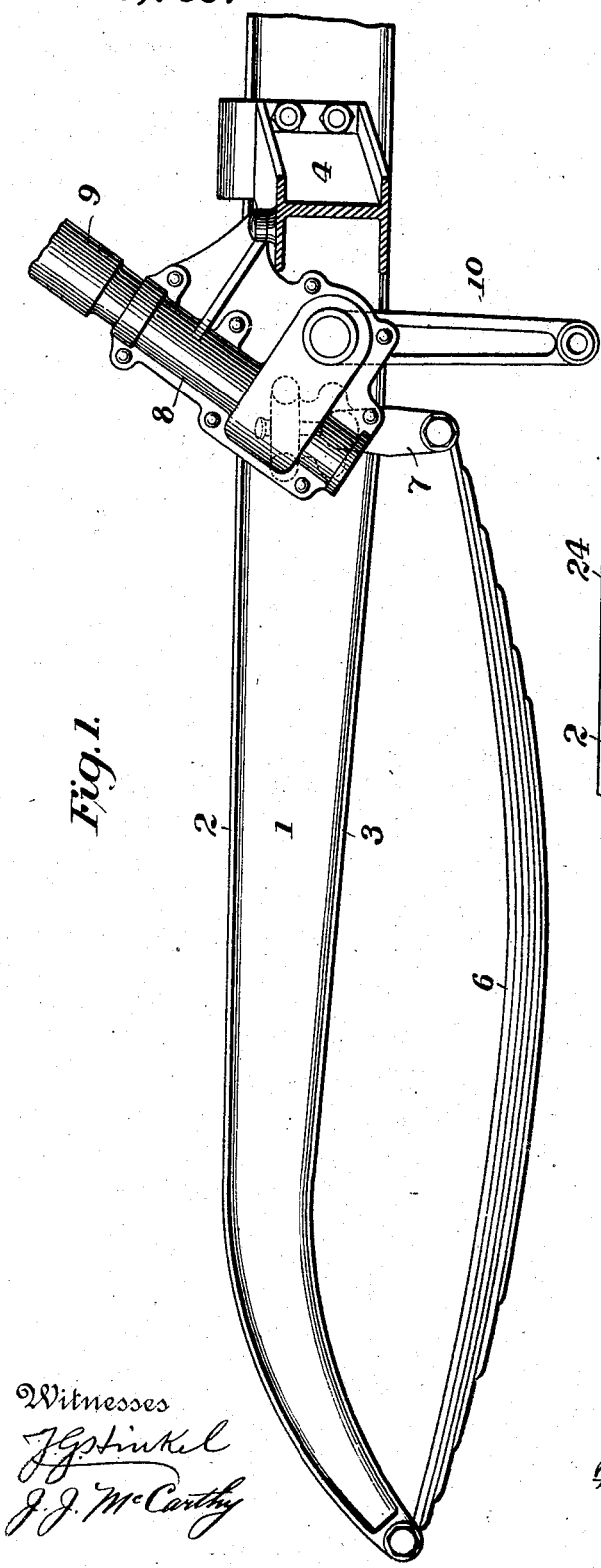

R. HUFF.
MOTOR VEHICLE.
APPLICATION FILED MAY 18, 1908.

915,769.

Patented Mar. 23, 1909.
2 SHEETS—SHEET 2.

UNITED STATES PATENT OFFICE.

RUSSELL HUFF, OF DETROIT, MICHIGAN, ASSIGNOR TO PACKARD MOTOR CAR COMPANY, OF DETROIT, MICHIGAN, A CORPORATION OF WEST VIRGINIA.

MOTOR-VEHICLE.

No. 915,769.     Specification of Letters Patent.     Patented March 23, 1909.

Application filed May 18, 1908. Serial No. 433,505.

*To all whom it may concern:*

Be it known that I, RUSSELL HUFF, a citizen of the United States, residing at Detroit, in the county of Wayne and State of Michigan, have invented certain new and useful Improvements in Motor-Vehicles, of which the following is a specification.

This invention relates to motor vehicles, and particularly to means for securing the rear end of the front spring and the steering gear casing to the side bar of the frame. Its objects are to simplify and improve the form of bracket used in securing these parts in place.

It embodies a single bracket to which the gear casing and spring are both attached, and its novel features will be apparent from the following description.

Figure 3:
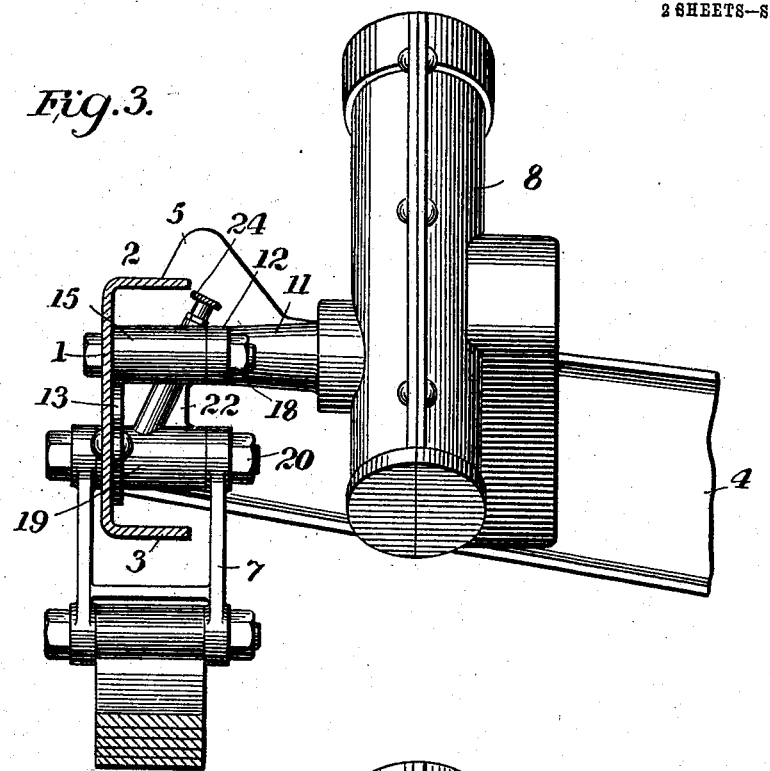

In the accompanying drawings—Figure 1 is a side view of the front portion of the side bar of the frame, showing my invention applied thereto; Fig. 2 is a detail view of the bracket, the gear casing being removed; Fig. 3 is a view partly in section, showing an end view of the bracket; and Fig. 4 is a section taken through the bracket itself and attached parts.

In the drawings, 1 represents the right side bar of the frame of a motor vehicle, which, as shown, is made in the ordinary form of a channel bar having the side flanges 2 and 3. 4 represents one of the transverse rear arms of the engine crank case which is secured to the side bar 1 and is provided with a lug 5 resting on the flange 2. The front spring 6 has at its rear end a shackle 7 which embraces the side bar 1 and is secured thereto by the means hereafter described. The steering gear casing 8 is of any ordinary form carrying the steering column 9 and including the ordinary gears operating the steering lever 10. This casing has an extension resting upon the arm 4 and has upon one side an arm 11 carrying at its outer end the perforated side ears or flanges 12 for the purpose of securing the casing to the supporting bracket hereafter described.

The bracket to which the casing and spring are secured embodies a web portion 13 which fits against the web portion of the side bar 1, and which is secured thereto by bolts or rivets 14. On the upper part of the web portion 13 there is an enlargement 15 which extends entirely across the top of the web and which projects therefrom to such an extent that its outer end will not be within the margin of the side flanges 2 and 3. This enlargement has the spaced longitudinal openings 16, 17 which are adapted to receive bolts 18 passing through the ears 12 on the arm 11. It will be understood that these bolts also pass through openings in the web of the side bar 1, and thus rigidly secure the casing, bracket and side bar together.

Figure 4:
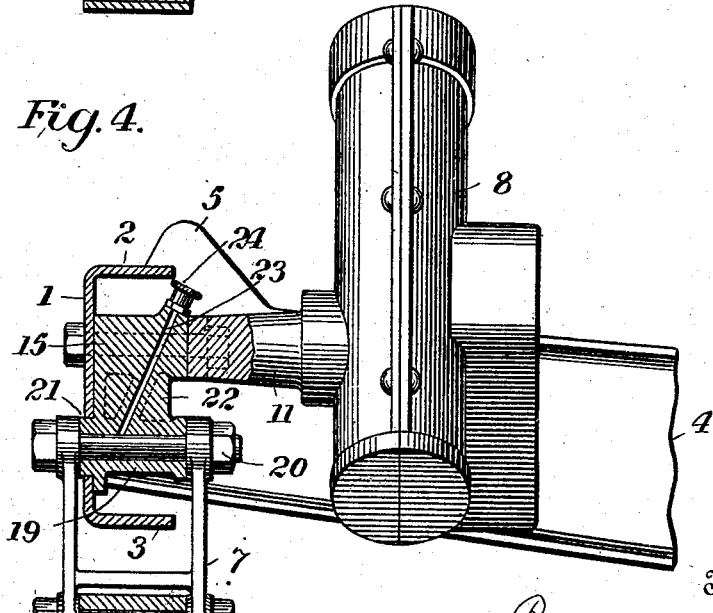

On the lower part of the web 13 and centrally thereof there is an enlargement 19 which is provided with a central longitudinal opening to receive the bolt 20 passing through the end of the shackle 7, and it will be observed by reference to Fig. 4 that there is a boss 21 on the opposite side of the web 13 in line with the enlargement 19, and that this boss fits within an opening in the side bar 1. The enlargements 15 and 19 are connected by a web 22 for the purpose of strengthening them and an oil passage 23 passes diagonally through the center of the enlargement 15 through the web 22 to the opening in the enlargement 19, it being observed that the web portion is enlarged around this passage. An oil cup 24 is secured to the upper end of this passage and supplies oil to the shackle bolt 20.

It will be observed that this bracket furnishes a fastening means for the casing and spring which is at once compact, convenient and strong, and which permits the shackle 7 to embrace the side bar furnishing pivotal connection therewith without permitting it to come in contact with the side bar.

It will be understood that the particular form of the bracket may be varied without departing from the spirit of my invention.

What I claim is:

1. In a motor vehicle, the combination with the frame side bar, the steering gear casing and the forward spring and its shackle, of a bracket secured to the side bar and provided in its lower part with an opening to receive the shackle bolt and in its upper part with means for attaching the steering gear casing.

2. In a motor vehicle, the combination with the frame side bar, the steering gear casing and the forward spring and its shackle, of a bracket secured to the side bar and provided in its lower part with an opening to receive the shackle bolt and in its upper part with openings to receive bolts on the steering gear casing.

3. In a motor vehicle, the combination with the frame side bar, the steering gear casing and the forward spring and its shackle, of a bracket secured to the side bar and provided with a web portion fitting the side bar and with a perforated enlargement on its lower portion to receive the shackle bolt and with an enlargement on its upper portion having perforations to receive bolts on the steering gear casing.

4. In a motor vehicle, the combination with the frame side bar, the steering gear casing and the forward spring and its shackle, of a bracket secured to the side bar and provided with a web portion fitting the side bar and with a perforated enlargement on its lower portion to receive the shackle bolt and with an enlargement on its upper portion having perforations to receive bolts on the steering gear casing, and a strengthening web joining said enlargements.

5. In a motor vehicle, the combination with the frame side bar, the steering gear casing and the forward spring and its shackle, of a bracket secured to the side bar and provided with a web portion fitting the side bar and with a perforated enlargement on its lower portion to receive the shackle bolt and with an enlargement on its upper portion having perforations to receive bolts on the steering gear casing, and a strengthening web joining said enlargements, the said web being provided with an oil passage leading to the perforation in the lower enlargement.

6. In a motor vehicle, the combination with the side channel bar, the steering gear casing and forward spring and its shackle, of a bracket having a web adapted to fit within the channel bar and to be bolted thereto, the said web being provided with perforated enlargements adapted to receive the shackle bolt and bolts on the steering gear casing.

7. In a motor vehicle, the combination with the side channel bar, the steering gear casing and forward spring and its shackle, of a bracket fitting within the channel of said bar, the said bracket having an upper perforated portion and a lower perforated portion extending approximately to the edge of the flanges of said bar, and bolts passing through said perforations and through the web of the channel bar securing the shackle and the gear casing to said bracket.

8. In a motor vehicle, the combination with the side channel bar, of a bracket fitting against the web of said bar and extending to the margin of the side flanges, a steering gear casing fitting against said bracket, bolts passing through a portion of said casing, bracket and web securing the parts together, and a spring shackle depending from said bracket and secured thereto by a bolt.

9. In a motor vehicle the combination with the side channel bar, of a bracket fitting against the web of said bar and extending to the margin of the side flanges, a steering gear casing fitting against said bracket, bolts passing through a portion of said casing, bracket and web securing the parts together, a boss on the lower part of said bracket extending through an opening in the web, a bolt extending through an opening in said boss and bracket, and a spring shackle depending from said bolt.

10. In a motor vehicle, the combination with the side bar of the frame, of a bracket fitting against said side bar, a steering gear casing fitting against said bracket, bolts passing through said casing, bracket and side bar securing the parts together, and means for supporting a spring shackle from said bracket.

11. In a motor vehicle, the combination with the side bar of the frame, of a bracket fitting against said side bar and provided with an upper enlargement, a steering gear casing provided with an arm having side flanges fitting against said enlargement, bolts passing through said flanges, enlargement and side bar securing the parts together, and means for supporting a spring shackle from said bracket.

12. In a motor vehicle, the combination with the side bar of the frame, of a bracket fitting against said side bar and secured thereto, a steering gear casing secured to said bracket, a boss on the lower part of the bracket extending through the web of the side bar, a spring shackle embracing said bracket, and a bolt passing through said boss, bracket and shackle.

13. In a motor vehicle, the combination with the side bar of the frame, of a bracket fitting against said bar and bolted thereto, a boss on said bracket projecting through an opening in the bar, an enlargement opposite said boss, a spring shackle embracing said bracket, and a bolt passing through said boss and enlargement and supporting said shackle.

14. In a motor vehicle, the combination with the side channel bar, of a bracket having a web portion bolted to the web of said bar within the side flanges, the said bracket having upon one side a boss extending through the bar and upon the other side enlargements extending to the edges of the side flanges.

15. A bracket for motor vehicles, comprising a web portion provided with an enlargement upon one side on its upper portion having two passages therethrough, and an enlargement on its lower portion having a passage therethrough, and provided with a boss opposite the lower enlargement having a corresponding passage.

16. A bracket for motor vehicles, comprising a web portion provided with an enlargement upon one side on its upper portion having two passages therethrough, and an enlargement on its lower portion having a passage therethrough, and provided with a boss opposite the lower enlargement having a corresponding passage, a strengthening web joining the two enlargements having an oil passage therein leading to the passage in the lower enlargement.

In testimony whereof I affix my signature in presence of two witnesses.

RUSSELL HUFF.

Witnesses:
 ALLEN LOOMIS,
 HOWARD HARKNESS.